No. 662,022. Patented Nov. 20, 1900.
A. PRESCOTT & L. I. FURBER.
SLUICE GATE.
(Application filed Mar. 28, 1900.)
(No Model.)
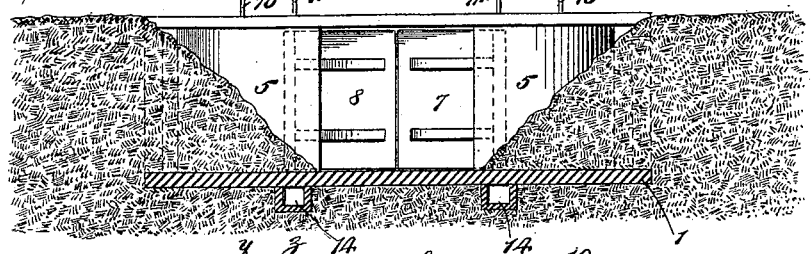
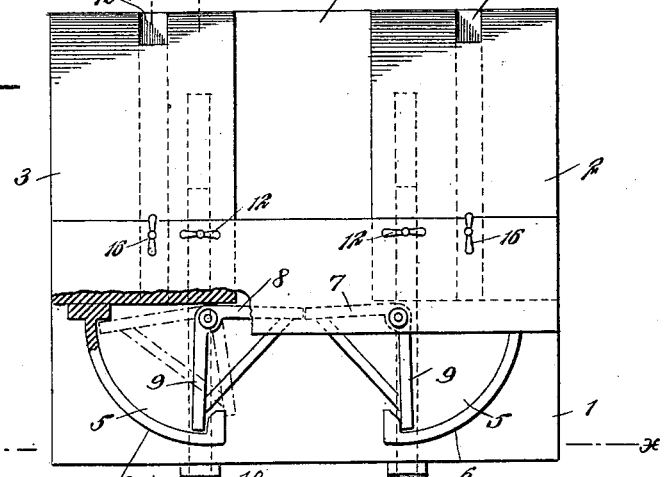
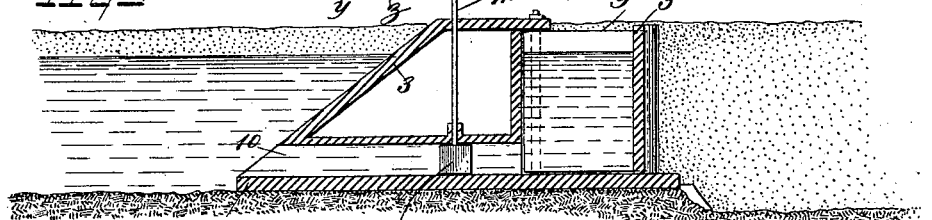
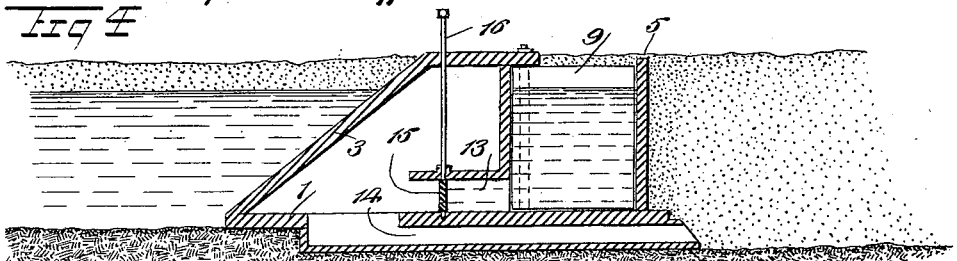
WITNESSES:
H. Walker
C. R. Ferguson
INVENTORS
A. Prescott
BY L. I. Furber
ATTORNEYS
THE NORRIS PETERS CO., PHOTO-LITHO., WASHINGTON, D. C.

UNITED STATES PATENT OFFICE.

AUGUSTUS PRESCOTT, OF SALEM, OREGON, AND LEWIS I. FURBER, OF WINLOCK, WASHINGTON.

SLUICE-GATE.

SPECIFICATION forming part of Letters Patent No. 662,022, dated November 20, 1900.

Application filed March 28, 1900. Serial No. 10,543. (No model.)

*To all whom it may concern:*

Be it known that we, AUGUSTUS PRESCOTT, of Salem, in the county of Marion and State of Oregon, and LEWIS I. FURBER, of Winlock, in the county of Lewis and State of Washington, citizens of the United States, have invented a new and Improved Sluice-Gate, of which the following is a full, clear, and exact description.

This invention relates to improvements in sluice-gates; and the object is to provide a gate particularly adapted for small streams, where the natural flow of water is not sufficient to make the stream practical for logging or timber-floating purposes without first building a separate dam to hold sufficient water to carry the logs or timbers either above or below the dam.

We will describe a sluice-gate embodying our invention and then point out the novel features in the appended claims.

Reference is to be had to the accompanying drawings, forming a part of this specification, in which similar characters of reference indicate corresponding parts in all the figures.

Figure 1 is a section on the line $x$ $x$ of Fig. 2 of a sluice-gate embodying our invention. Fig. 2 is a plain view of the gate. Fig. 3 is a section on the line $y$ $y$ of Fig. 2, and Fig. 4 is a section on the line $z$ $z$ of Fig. 2.

The sluice-gate comprises a base or platform 1, above which are placed casings 2 3, which extend upstream and have their upper surfaces inclined downward, as plainly indicated in the drawings. The space 4 between the casings 2 and 3 forms the sluice, through which floating material may pass. At the downstream end, forward of each casing 2 3, is a forebay 5, each forebay being formed by an outer wall 6, open at the inner side. Gates 7 8 are pivoted in the forebays, as plainly shown in Fig. 2, and extended at an angle from each gate is a wing portion 9, having a width sufficient to close the opening of the forebay, and the width of said wing is greater than the width of the gate, so that a greater area is provided for water-pressure to close the gate. Passing underneath each casing 2 3 and communicating with the forebays is a sluice 10. These sluices 10 receive water from the upstream end, and within each sluice is a cut-off valve 11, having a stem 12, extended upward through the casing and terminating in a suitable handle. From each forebay a short sluice 13 extends upstream and discharges into the casing, from which the water may discharge downstream from the casing through a sluice 14, passing underneath the platform 1. In each short sluice 13 is a valve 15, having an upwardly-operating rod or stem 16.

In operation, assuming that the gates are closed, as indicated in Fig. 2, and it is desired to open them, the valves 11 are to be moved to a closed position and the valves 15 opened. This will permit the water in the forebays to pass out through the sluices 14, relieving the pressure on the wing portions 9. The pressure of water against the gates will then swing them to their open position.

When it is desired to again close the gates, the valves 15 are to be closed and the valves 11 opened, permitting the water to enter through the sluices 10 to the forebays, and as the area of the wings 9 is considerably greater than the area of the gates the pressure of water flowing into the forebays will act to move the gates to a closed position against the water resistance.

Having thus described our invention, we claim as new and desire to secure by Letters Patent—

1. In a sluice-gate, casings terminating in forebays at the downstream end, water-inlet sluices leading through the casings and into the forebays, valves in said sluices, outlet-sluices leading from the forebays, valves for the outlet-sluices, gates pivoted at the downstream ends of the casings, and wings extended from the gates and operating in the forebays, the said wings having a greater area than the gates, substantially as specified.

2. In a sluice-gate, a platform, casings arranged on opposite sides of said platform, the inner walls of said casings forming the side walls of the main sluice, the upper surfaces of said casings being inclined downward at the upstream end, forebays at the downstream ends of the casings, valve-controlled sluices extended through the casings and communicating with the forebays, outlet-sluices leading from the forebays, valves in said outlet-sluices, gates for closing the main sluice, and wings extended at right angles from the gates and movable in the forebays, the said wings having a greater surface area than that of the gates, substantially as specified.

In testimony whereof we have signed our names to this specification in the presence of two subscribing witnesses.

AUGUSTUS PRESCOTT.
LEWIS I. FURBER.

Witnesses:
W. S. WARNE,
JOEL V. WARNE.